Aug. 10, 1937.   T. W. KOERNER   2,089,383
RESILIENT MOUNTING FOR REFRIGERATING APPARATUS
Filed July 2, 1935
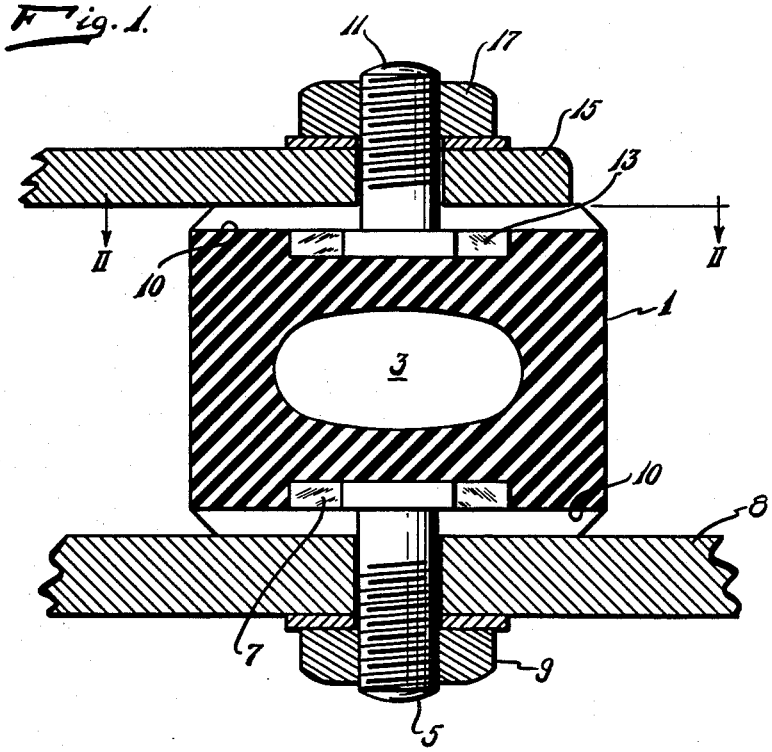
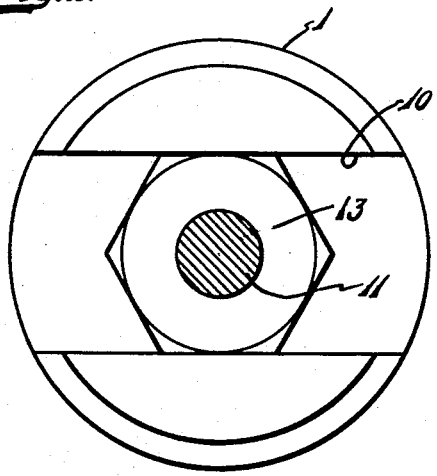
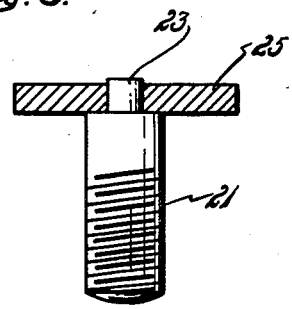
INVENTOR.
THEODORE W. KOERNER
BY
ATTORNEY.

Patented Aug. 10, 1937

2,089,383

UNITED STATES PATENT OFFICE 2,089,383

RESILIENT MOUNTING FOR REFRIGERATING APPARATUS

Theodore W. Koerner, Detroit, Mich., assignor to Kelvinator Corporation, Detroit, Mich., a corporation of Michigan Application July 2, 1935, Serial No. 29,535

1 Claim. (Cl. 248—358)

My invention pertains to resilient mountings and more particularly to vibration absorbing mountings for supporting refrigerant compressor machines upon a refrigerator cabinet in floating acoustically insulated relation.

It is an object of my invention to provide a resilient compressor machine mounting comprising a cylindrical body of soft rubber having a transverse aperture of oblong cross section and secured to an anchor bolt having its head vulcanized to one side of the rubber body and an apparatus receiving bolt having its head vulcanized to the side opposite the aperture whereby the body is freely yieldable in axial and transverse directions to absorb vibrations of the apparatus receiving means relative to the anchor bolt.

The invention itself, however, both as to its organization and its method of operation, together with additional objects and advantages thereof, will best be understood from the following description of a specific embodiment, when read in conjunction with the accompanying drawing, in which:

Fig. 1 is an elevational sectional view of my resilient vibration absorbing mounting;

Fig. 2 is a transverse sectional view on line II—II thereof; and

Fig. 3 is a detail view thereof.

Referring more specifically to the drawing, my vibration absorbing mounting comprises a body 1 of resilient spongy material having an aperture 3 extending transversely therethrough. The body 1 may be designed of suitable shape for any particular installation, but is preferably of substantially cylindrical conformation as shown. Although various spongy resilient materials are available I have found that soft rubber is best adapted for this purpose.

The aperture 3 is preferably of elliptical or oblong cross-section, as shown, and it extends through the cylindrical body of soft rubber between the ends and transversely to the axis thereof. Extending transversely across the ends or mounting faces of the cylindrical body 1 are grooves 10 of a substantial depth to provide in each face spaced ribs of greater transverse flexibility than the body 1. Attached to one end of the cylindrical body 1 of soft rubber I have provided anchoring means which comprises a bolt 5 having its head 7 vulcanized into the end of the rubber body beyond the bottom of said groove 10 and its threaded shaft 5 projecting axially therefrom to allow freedom of movement in any sidewise direction for absorbing vibrations. The bolt 5 is thus disposed for convenient insertion into an aperture provided in any structure 8, on which it is to be mounted, and the mounting is clamped to the supporting structure 8 by a nut 9 threadably engaged on the end of the bolt.

Apparatus receiving means is provided at the opposite end of the resilient mounting comprising a bolt 11 having its head 13 similarly seated and vulcanized in the opposite end of the rubber body 1 as set forth with respect to the mounting of the bolt 5. The threaded portion of the apparatus receiving bolt projecting axially from the end of the body conveniently receives the corner 15 of a machine base plate, or a foot projecting from a machine to be mounted, which is clamped thereto by a nut 17 threadably received on the end of the bolt.

The anchor and apparatus receiving bolts 5 and 11 may comprise a threaded shaft 21 having an extension 23 of smaller diameter, as shown in Fig. 3. The head portion is provided by mounting a flat washer like member 25 upon the smaller extension 23 to which it may be secured as by welding or riveting, for example. As will be understood the anchor and the apparatus receiving bolts may also be made from a solid bar if desired.

In operation the vibrations of the machine are transmitted from the machine base or foot 15 to the apparatus receiving means on the end of the rubber body and are readily absorbed by the rubber body which is freely yieldable in axial and transverse directions. This is effectively accomplished because the oblong aperture 3 extending axially through the rubber body 1 permits the rubber at the sides thereof to be very freely compressed while the mounting means seated in the grooves on the ends of the body permit movement in any direction sideways.

It will be seen that I have provided an improved vibration absorbing mounting of simple, compact construction which may be very conveniently installed for supporting vibration producing machinery upon a structure which is to be acoustically insulated therefrom.

Aside from the specific embodiments of the invention herein shown and described, it will be understood that numerous details of the construction may be altered or omitted without departing from the spirit and scope of the invention as disclosed and claimed, and that I do not desire to limit the invention to the exact constructions herein set forth.

I claim as my invention:

A vibration-absorbing mounting device comprising a body of resilient material having opposed mounting faces provided with grooves of substantial depth extending across the same to provide in each face spaced ribs of greater transverse flexibility than said body, said body having an aperture extending therethrough intermediate and transversely of said grooves, and coaxial mounting means having heads secured in said body inwardly of said mounting faces and the bottoms of said grooves, whereby said body is capable of free yielding movement in axial and transverse directions for absorbing vibrations of one of said mounting means relative to the other.

THEODORE W. KOERNER.